United States Patent [19]
Warner

[11] Patent Number: 5,430,259
[45] Date of Patent: Jul. 4, 1995

[54] MEASUREMENT OF STAND-OFF DISTANCE AND DRILLING FLUID SOUND SPEED WHILE DRILLING

[75] Inventor: Kevin L. Warner, Houston, Tex.

[73] Assignee: Baker Hughes Incorporated, Houston, Tex.

[21] Appl. No.: 166,233

[22] Filed: Dec. 10, 1993

[51] Int. Cl.⁶ .............................................. G01V 1/00
[52] U.S. Cl. ...................................... 181/105; 367/35
[58] Field of Search ............... 181/105, 102, 103, 104, 181/106; 367/35, 99

[56] References Cited

U.S. PATENT DOCUMENTS

| | | | |
|---|---|---|---|
| 4,867,264 | 9/1989 | Siegfried | 181/105 |
| 5,341,345 | 8/1994 | Warner et al. | 181/105 |

Primary Examiner—Daniel T. Pihulic
Attorney, Agent, or Firm—Gunn & Associates

[57] ABSTRACT

An MWD measuring apparatus and technique using a single transducer mounted on an MWD drill collar near a tubular member, such as an upset or stabilizer blade. The minimum stand-off is the radial difference between the MWD drill collar and the tubular member when the drillstring is side-walled against the borehole wall. Control apparatus connected to the transducer determines elapsed time for each pulse transmitted towards and reflected from the borehole wall. A plurality of round-trip transit time (RTT) values are measured and the results statistically analyzed to identify and verify the $RTT_{min}$ value corresponding to the minimum stand-off distance. The RTT values may be analyzed directly or using histogram techniques. Once determined, the sound speed of the drilling fluid is calculated as twice the radial difference between the MWD collar and stabilizer blade or upset divided by the $RTT_{min}$ value. Also, the sound speed is used to calculate the stand-off distance corresponding to other RTT values, if desired.

24 Claims, 3 Drawing Sheets

MEASUREMENT OF STAND-OFF DISTANCE AND DRILLING FLUID SOUND SPEED WHILE DRILLING

BACKGROUND OF THE INVENTION

1. Field Of The Invention

The present invention relates to a method and apparatus for measuring the sound speed of drilling fluid for use in accurately calculating the stand-off distance between a drillstring and the borehole wall while drilling subterranean oil and gas wells.

2. Description Of The Related Art

Apparatus for measuring the inner diameter of a borehole is well known in the art, where a borehole is a well bore drilled into the earth. Until recently, sonde-type devices were commonly used to make such measurements, where a sonde is a wireline device lowered into the borehole after drilling operations have ceased. Borehole measurements using sonde devices is very time consuming and costly, especially considering the fact that drilling operations must cease and the drillstring must be removed. Early sonde devices used mechanical calipers extending from the sonde to contact the borehole wall to measure the borehole diameter. There are several disadvantages associated with the use of mechanical devices, including significant maintenance, frequent failures and breakdowns and a high incidence of inaccurate measurements. Mechanical devices may also cause damage to steel casing of the well.

More recently, ultrasonic acoustic devices have been developed for measuring various parameters, including borehole diameter and stand-off distances in a borehole. At first, the acoustic devices were mounted on a sonde and lowered into the borehole, so that drilling operations still had to be interrupted while the measurements were being made. Also, the sonde had to be mounted with several acoustic devices around the circumference of the sonde for making the appropriate measurements, since the sonde typically did not rotate. Furthermore, the sonde devices with multiple acoustic devices could be very complex and costly.

Subsequently, measurement-while-drilling (MWD) techniques have been developed to overcome the disadvantages of sonde devices. MWD measuring tools typically take advantage of acoustic devices and transducers, where these devices are mounted on or within one or more MWD drill collars provided on the drillstring. The drillstring includes a series of drill pipe serially linked to a series of drill collars. The drill collars are connected to a drill bit used to drill the borehole. The primary function of the drill collars is to provide a downward thrust or weight on the drill bit. Since the stand-off measurements were made while the drillstring is in the borehole, the measurements were typically made of the stand-off distance between the drillstring and the borehole wall. The measurements may be stored and later retrieved, sent immediately to the surface using other communication techniques, or concurrently used in data analysis apparatus.

An acoustic device transmits an acoustic pulse towards a surface, such as the borehole wall, where the acoustic pulse reflects off the surface and is detected by an acoustic receiver. Often, the acoustic device is an acoustic transducer or transceiver capable of transmitting, detecting and receiving acoustic pulses. The elapsed time between the transmission and reception of the pulse, referred to as the round-trip transit time (RTT), is used to calculate or derive the distance of travel. The relative position of the surface is half this distance.

While the use of acoustic devices have facilitated MWD, the primary problem is the determination of the sound speed of the drilling fluid present in the borehole. The drillstring is immersed in the drilling fluid, where the drilling fluid is preferably a special mixture of clay, water and chemical additives pumped downhole through a center bore of the drillstring during drilling operations, out of the drill bit and upwardly through the annulus to return to surface drilling equipment. The drilling fluid cools the rapidly rotating bit, lubricates the drillstring if it is rotating in the well bore, carries rock cuttings to the surface and serves as a plaster to prevent the borehole wall of the borehole from crumbling or collapsing. The drilling fluid also provides the weight or hydrostatic head to prevent extraneous fluids from entering the borehole and control downhole pressures that may be encountered.

In general, the sound speed of the drilling fluid is not known and depends upon the type of drilling fluid being used, the percent of solids existing in the fluid, the salinity and density of the fluid, and the borehole temperature and pressure. Some techniques estimate the sound speed based on theoretical considerations, or otherwise use a measurement of the sound speed taken before or after the drilling operations. However, sound speed values of known drilling fluids vary from less than 1,100 meters per second (m/s) to greater than 1,800 m/s. Also, conditions in the borehole change during drilling operations, which directly modify the drilling fluid and its sound speed characteristics. Therefore, an accurate determination of the sound speed of the drilling fluid is considered necessary for an accurate acoustic stand-off measurement when using acoustic measuring devices.

Of course, the most direct method known for measuring the sound speed is to measure the RTT of a pulse which travelled through a known distance. Establishing the known distance then becomes the primary goal to solving the sound speed measurement. So far, the only reliable way of establishing a known distance for MWD type measuring apparatus has traditionally been to use multiple acoustic devices. One such example is disclosed in U.S. Pat. No. 4,665,511 to Rodney, et al. The apparatus disclosed in Rodney includes at least one acoustic transceiver disposed within a section of the drillstring. A second acoustic receiver is disposed longitudinally along the drillstring at a selected distance away from the transceiver, where the receiver detects a portion of each acoustic pulse generated by the transceiver. The difference in travel time between the pulse sensed by the second receiver and the pulse sensed by the transceiver is intended to be determinative of the acoustic velocity of the drilling fluid through which the pulses have propagated. This is based on the assumption that the difference in distances of the travel paths of the respective pulses is known.

The primary problem with a device according to Rodney is that the path through which each acoustic pulse travels is not well-defined. Due to the rather coarse or jagged surface of the borehole wall, the highly directional nature of acoustic devices and the high incidence of refracted acoustic pulses, measurement is difficult if not indeterminate. In these conditions, there are several paths that each pulse may travel, so that the receiver may detect multiple reflections.

Thus, it is not readily known which reflection represents the desired, predetermined path. Furthermore, even if accurate measurements are acquired, the use of multiple devices significantly increases the cost of the overall system. The cost includes one or more additional acoustic devices as well as the cost of the mounting apparatus for each device. Also, a drill collar appropriately fashioned for mounting multiple devices in appropriate locations is required, and each device must be connected to control circuitry. U.S. Pat. No. 4,979,151 to Ekstrom et al discloses an acoustic stand-off measuring system for a wireline logging system wherein a second transducer unit is used to obtain a direct measurement of the sound speed of the drilling fluid. The pending application Ser. No. 08/104,433 (Kevin S. Warner) filed Aug. 8, 1993 and assigned to the assignee of this disclosure teaches the use of a second transducer into to directly measure the sound speed of the drilling fluid in a MWD embodiment.

Other techniques have been tried using a single transceiver. An example is U.S. Pat. No. 5,130,950 to Orban et al which teaches the use of a single transducer to measure standoff in an MWD embodiment wherein the sound of the drilling fluid is obtained from tables of sound speed as a function of the temperature and pressure of the drilling fluid. None of these techniques to date has been successful since they either ignore the sound speed of the drilling fluid or estimate the sound speed based upon theoretical values or measured values taken before or after drilling operations. Obviously, these devices have limited accuracy.

Thus, it is desirable to measure the stand-off distance and sound speed of drilling fluid as accurately as possible and during drilling operations, using the simplest and most cost-effective system as possible. It is preferable if only a single transceiver or transducer is used while still obtaining accurate measurements.

SUMMARY OF THE INVENTION

An MWD apparatus and technique is disclosed for measuring the stand-off distance and the sound speed of the drilling fluid in a borehole using a single ultrasonic transducer. The ultrasonic transducer is positioned on an MWD drill collar near a tubular ring or member, where the radius of the tubular member is greater than the radius of the drillstring and the MWD collar. The tubular member is typically a cylindrically shaped upset formed from upset tubing, or, alternatively, the tubular member is a stabilizer blade. The radial difference between the MWD collar and the tubular member is predetermined. The minimum possible stand-off distance occurs when the drillstring is side-walled against the borehole wall and the transducer is directly facing the borehole wall. In this position, the tubular member displaces the acoustic device from the borehole wall approximately equal to the radial difference between the tubular member and the MWD collar. Thus, since the radial difference is known and predetermined, the sound speed of the drilling fluid distance is calculated by measuring the RTT value of the ultrasonic pulse at the minimum stand off position, and then dividing twice the radial difference by the minimum RTT value.

Acoustic measurements are continually made if the drillstring is rotating within the borehole, or can be made periodically if the drillstring is sliding. The measurement need only be made once if the position and RTT orientation of the drillstring and transducer can be verified within an interval of wellbore in which the acoustic characteristics of the drilling fluid are believed to remain constant. The key is knowing when the transducer is in the minimum stand-off position and whether the drillstring assumes this position while drilling. Field tests have verified that rotary drilling equipment spends a significant amount of time against the borehole wall during drilling operations. Further, the field tests verified that a minimum stand-off is sampled during most of the intervals actually observed.

If the drillstring is rotating, The acoustic measurements are received in the form of a plurality of RTT values, which may be plotted versus elapsed time on a graph. The plotted curve may take many forms depending upon the shape of the borehole wall circumference and the location of the drillstring. Typically, the plot appears very similar to a sinusoidal wave when the drilling equipment is side-walled and the drillstring is rotating since the borehole is generally cylindrical or oval shaped. RTT or stand-off snap-shots may be retrieved, where each snap-shot comprises an array of RTT values and corresponding real-time values for a relatively short period of time, such as a few seconds. Each snap-shot pattern may be analyzed using standard time and frequency domain techniques to determine the frequency of the minimum, the frequency content, and the departure from minimum. This information is used to assign a quality factor to the data as it is taken, and only the data of the highest quality are used to determine the sound speed of the drilling fluid. Recent minimums are compared to those determined in the recent past to ascertain the quality of the data. These data can also be used to circumferentially map or caliper the wellbore as a function of depth.

Once a repeatable and periodic minimum value is obtained, the sound speed of the drilling fluid may be readily calculated and then compared to past values or theoretical values. If the values compare within a statistically acceptable deviation, then the minimum stand-off and the corresponding sound speed value of the drilling fluid are considered reliable. Each of the RTT values is first divided by 2 and then multiplied by the sound speed to derive the stand-off distances, which values may also be plotted versus elapsed time. The calculations described are preferably performed using a computer with appropriate memory, timers and data analysis software routines. The entire procedure may be performed in software.

In conventional rotary drilling, the entire drillstring is rotated to rotate the drill bit when drilling the borehole. However, the technique of the present invention may be applied to another type of rotary drilling, referred to as turbodrilling. In turbodrilling, a fluid-drive turbine, commonly called a mud motor, is placed in the drillstring just above the drill bit. The pressure from the pumps at the surface pumping drilling fluid or mud down through the drill stem turns the turbine which rotates the drill bit. The drillstring does not rotate as in conventional rotary drilling, but instead slides within the borehole as the drill bit penetrates further into the formation.

Turbodrilling is more common when drilling slanted or horizontal boreholes. In slanted or horizontal boreholes, the minimum stand-off measurement is taken when the tubular member is resting on the lower side or "bottom" of the borehole and the transducer is facing the borehole wall. The drillstring is manipulated until it is established that the acoustic device is at the minimum stand-off distance. The orientation of the drillstring may be verified through surveys with magnetometers and accelerometers. Once the position is verified and a measurement is taken, the minimum RTT value measurement is directly used to calculate sound speed.

An alternative data analysis technique is to derive stand-off histograms from the RTT values. Each RTT value corresponds to a "count" in one column or bin of a histogram, where each bin represents a sub-range of time within a total range of expected RTT time values. As each RTT value is measured, it is compared to the bin ranges and assigned to an appropriate bin. The bin is simply incremented when an RTT value corresponding to that bin is received. The bins representing the shortest RTT time values are analyzed to determine the minimum RTT value, and the sound speed is readily calculated. This alternative procedure may also be performed primarily by software, and would require less memory.

BRIEF DESCRIPTION OF THE DRAWINGS

A better understanding of the present invention can be obtained when the following detailed description of the preferred embodiment is considered in conjunction with the following drawings, in which:

FIG. 3b is a graph of stand-off distance plotted versus elapsed time derived from the graph of FIG. 3a.

DETAILED DESCRIPTION OF THE PREFERRED EMBODIMENT

Figure 1:
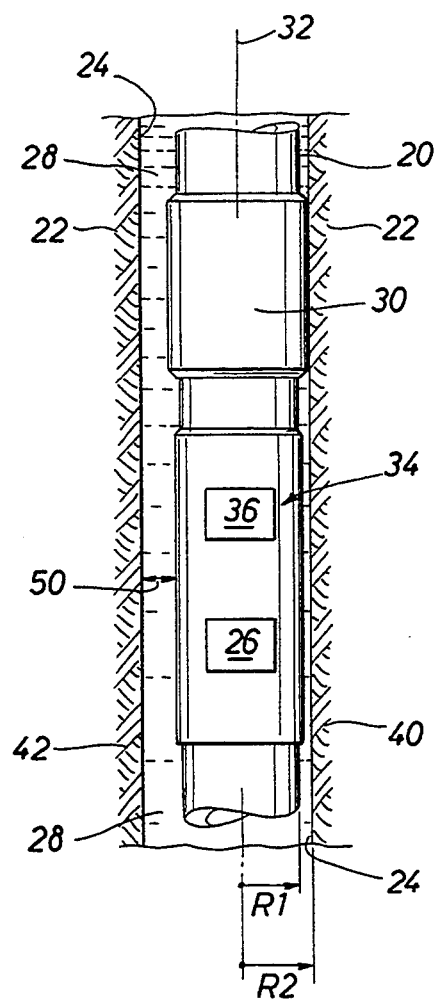
FIG. 1 shows a cross-sectional elevation view of a drillstring in a borehole, where the drillstring includes a sound speed measuring device according to the present invention.

Referring now to FIG. 1, a cross-sectional elevation view is shown illustrating a drillstring 20 used to drill a borehole in the earth 22. The borehole includes a borehole wall 24, where the stand-off distance, referred to by the letters SD, is the distance between the drillstring 20 and the borehole wall 24. The drillstring 20 typically includes a series of drill pipe connected to a series of drill collars, where a measurement while drilling (MWD) collar 26 is shown. The MWD drill collar 26 is further connected to a drill bit (not shown) provided at the end of the drillstring 20. A drill collar such as 26 is a tubular or cylindrical pipe joint having threader box (female) and pin (male) ends for attaching to other drill collars in the drillstring 20. It is common for the drill collars to be located near the drill bit. The drillstring 20 includes a central bore or conduit (not shown) used to pump drilling mud or drilling fluid 28 into the borehole. The drilling fluid 28 exits the drill bit and fills the annulus or borehole between the drillstring 20 and the borehole wall 24 as the fluid is pumped upwardly to the surface in a known manner. Thus, the drillstring 20 is essentially immersed in the drilling fluid 28.

The drillstring 20 preferably includes a tubular member 30, where the tubular member 30 is preferably cylindrical and has a radius R2 relative to a central axis 32 of the drillstring 20. The radius of the MWD drill collar 26 relative to the central axis 32 is R1, where R2 is greater than R1. The tubular member 30 is typically a stabilizer blade used to help hold the drill bit on course. Alternatively, the tubular member 30 could be in the form of upset tubing, where upset tubing is made thicker in the area of the threads between the drill pipe and the MWD drill collar 26 in order to compensate for the metal cut away in making the threads. Typically, the additional metal is put on the inside, but is preferably put on the outside of the drillstring 20, where it is then referred to as exterior-upset tubing. The term "tubular member" is generically used for any tubular or cylindrical structure, such as an upset or blade, which has a greater radius than the MWD drill collar 26 so as to displace the MWD drill collar 26 from the borehole wall 24.

An acoustic transducer 34 is mounted on the MWD drill collar 26 using one of many mounting methods known to those skilled in the art. The transducer 34 is preferably a piezoelectric acoustic transducer including a piezoelectric crystal fashioned to convert acoustic signals to electrical signals and vise versa, although other types of transducers are contemplated. The transducer 34 generates a series of acoustic pulses, where each pulse propagates through the drilling fluid 28, reflects off the borehole wall 24 as an echo pulse, which propagates back towards the transducer 34. The piezoelectric crystal detects the echo pulse, where the transducer 34 preferably includes a receiver and amplifier, so that the transducer 34 serves as an acoustic transceiver.

It will be appreciated that the duration of each of the acoustic pulses is sufficiently shorter than the time required for the pulses to propagate from the transducer 34 to the borehole wall 34 and back again. The magnitude of the pulses must also be sufficient to assure detection of the reflected echo pulse by the transducer 34. In addition, it is important that the rotation of the drillstring 20 has not rotated the transducer 34 beyond the point at which the reflected echo is no longer detectable. This requires that the round-trip transit time (RTT) of the pulse is sufficiently less than the time required to move the transducer 34 by more than its diameter. Since the drillstring 20 typically rotates at approximately 40 revolutions per minute (rpm) and the sound speed of the drilling fluid 28 is about 1100 to 1800 meters per second, the drillstring 20 typically does not rotate appreciably before the echo pulse is received by the transducer 34.

Figure 2:
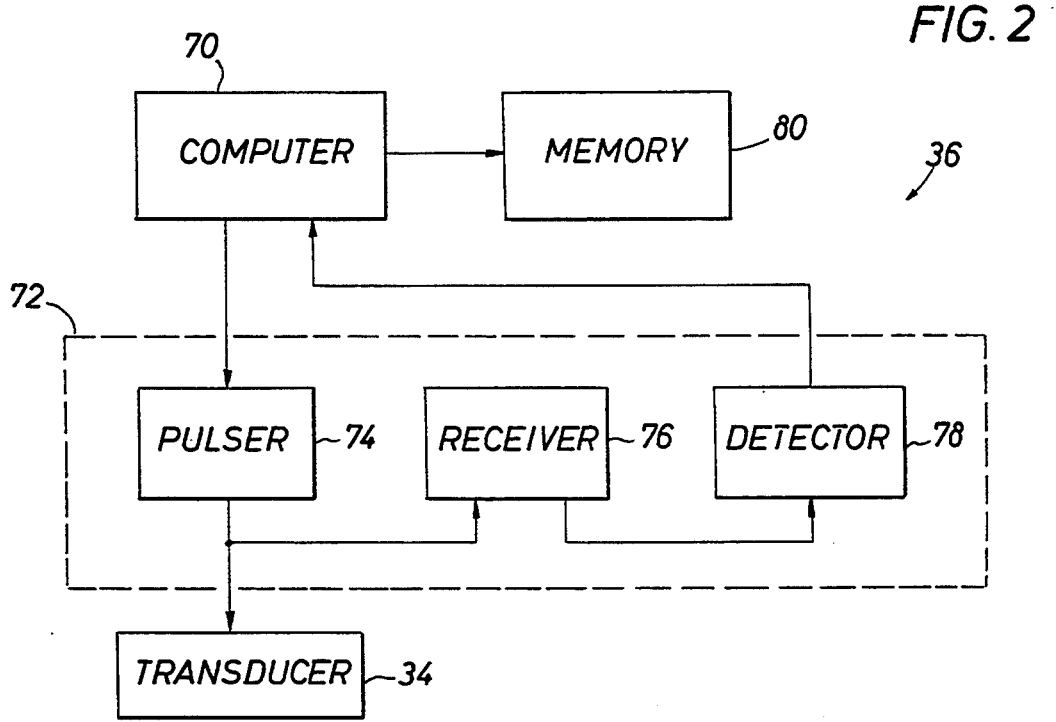
FIG. 2 shows one embodiment of a computer and control apparatus which may be used with a sound speed measuring device of the present invention.

A computer and control apparatus 36 is preferably mounted within the MWD drill collar 26 and connected to the transducer 34. The computer and control apparatus 36 includes the appropriate circuitry for activating the transducer 34 to send each acoustic pulse and to detect the echo pulse as reflected off the borehole wall 24. FIG. 2 shows one possible embodiment of the computer and control apparatus 36 coupled to the transducer 34, it being understood that many other embodiments are possible for use with the present invention. A computer 70 controls a pulse echo system 72 by determining when to assert each acoustic pulse. The pulse echo system 72 preferably includes a pulser 74, a receiver 76 and a detector 78. The pulser 74 is connected to the transducer 34, where the transducer 34 is also connected to the receiver 76. The detector 78 is connected to the receiver 76 and to the computer 70. A memory system 80 is preferably connected to the computer 70 for storing software and data.

In operation, the computer 70 sends an activation signal to the pulser 74, which responsively applies a voltage signal to the transducer 34. The transducer 34 responds by generating an acoustic pulse. The computer 70 initiates an internal timer (not shown) approximately coincident with the activation signal sent to the pulser 74, indicating the approximate time that the transducer 34 initiates transmitting the acoustic pulse. The timer may be any type of digital timer as known to those skilled in the art, but generally is a binary counter. The transducer 34 receives the reflected acoustic pulse and converts it into electrical signals detected by the receiver 76. The receiver 76 transmits an amplified signal to the detector 78. The detector 78 sends a corresponding signal back to the computer 70, which then stops or otherwise reads the timer and stores its value corresponding to an RTT value. The detector 78 preferably includes rectification and filtering circuitry to identify the approximate time the transducer 34 receives the reflected acoustic pulse. When the reflected acoustic pulse is received, the detector 78 transmits a digital signal to the computer 70.

The computer and control apparatus 36 measures the elapsed RTT value for each acoustic pulse. In the preferred method of operation, a plurality of acoustic pulses are transmitted while the drillstring 20 rotates within the borehole, so that the computer 70 sends a plurality of signals to the pulser 74 and stores a plurality of RTT values in the memory 80. The transducer 34 typically transmits and receives each pulse before sending another pulse. In this manner, a plurality of pulses are transmitted and received throughout the entire diameter of the borehole wall 24 of the borehole, so that a plurality of RTT values are measured and stored by the computer and control apparatus 36. Each represents the stand-off distance SD at a given point along the circumference of the borehole wall 24. The rate of measurements upon depends the desired accuracy and borehole conditions, but is typically between 100 to 200 samples per second. The computer and control apparatus 36 may either analyze these RTT values when received, or may store the RTT values, or may perform both of these functions.

In conventional rotary drilling operations, the entire drillstring 20 rotates about the central axis 32 during drilling operations, although some wobbling may occur. The drillstring 20 may float within the borehole while rotating, and is often side-walled against the borehole wall 24. The drillstring 20 is shown side-walled in FIG. 1 against the borehole wall 24. When the drillstring 20 is side-walled, the MWD drill collar 26 is displaced from the borehole wall 24 by the radial difference (R2−R1). In the preferred embodiment, it is desired that the transducer 34 be mounted on the MWD drill collar 26 as close to the tubular member 30 as possible. In this manner, when the drillstring 20 has rotated so that the transducer directly faces the borehole wall 24, and when the drillstring 20 is side-walled, the acoustic pulse travels a distance approximately equal to twice the radial difference R2−R1.

The actual distance of travel of the acoustic pulse may vary depending upon the surface condition of the borehole wall 24 and whether the drillstring 20 is actually side-walled. In general, when the drillstring 20 is side-walled against the borehole wall 24, and when the transducer 34 is directly facing the borehole wall 24, the measured RTT value is at a minimum, referred to as $RTT_{min}$. Field test data indicates that the drillstring 20 spends a significant amount of time side-walled against the borehole wall 24 during drilling operations, so that the measurement of the $RTT_{min}$ value is made relatively frequently. Once the $RTT_{min}$ value is measured, the sound speed of the drilling fluid 28 can be calculated using the following equation 1:

$$V = \frac{2(R2 - R1)}{RTT_{min}}$$

where V is the sound speed of the drilling fluid 28.

Figure 3A:
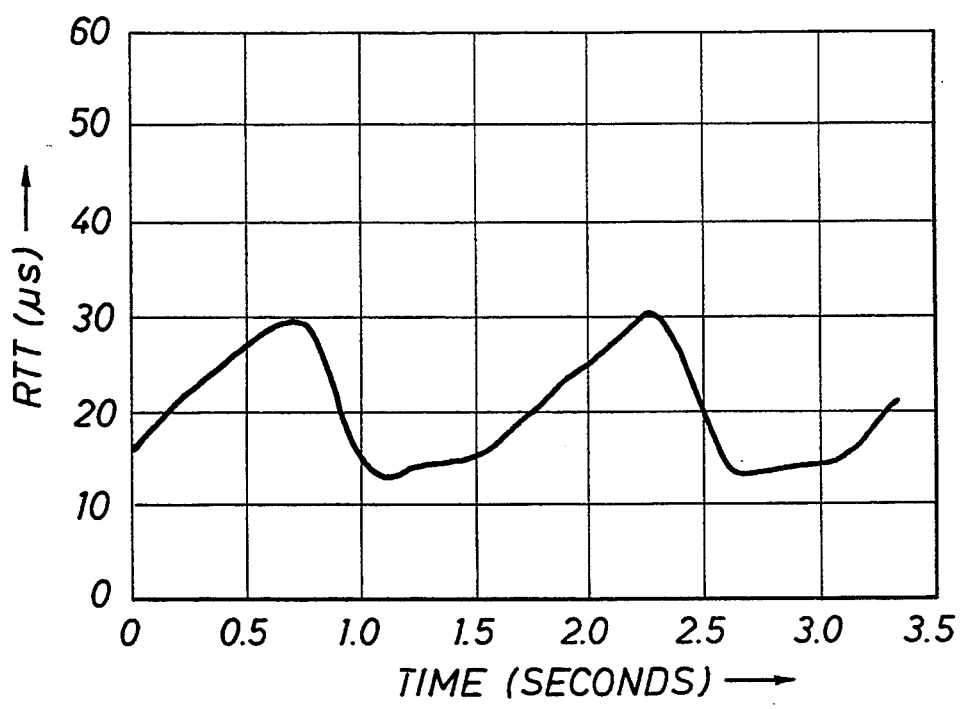
FIG. 3a is graph of measured round-trip transit times plotted versus elapsed time for a given period.

Referring now to FIG. 3a, a graph is shown illustrating a plot of RTT values measured versus elapsed time while the drillstring 20 is rotating in a borehole at approximately 40 rpm. The measurement rate was 150 RTT values per second, and a snap-shot of about 3.3 seconds is shown. Elapsed time in seconds is provided on a horizontal axis, referred to as the x-axis, whereas time in microseconds ($\mu s$) corresponding to the expected RTT values is provided along the vertical axis, referred to as the y-axis. As shown in FIG. 3a, the graph or snap-shot of RTT values generally resembles a sinusoidal wave having a period of approximately 1.5 seconds, corresponding to the 40 rpm rotation of the drillstring 20. At first, it is not known for sure whether the drillstring 20 is side-walled during this snap-shot. However, a periodic minimum of the waveform occurs approximately every 1.5 seconds, at approximately 1.25 and 2.75 seconds, respectively, corresponding to the transducer 34 directly facing the borehole wall 24. Several snap-shots are retrieved, stored and analyzed to determine whether they also include a periodic minimum. For those that do, the minimum values are compared to verify whether the minimum RTT values are the same, or within an expected statistical deviation. Thus, present minimum RTT values are compared to recent past minimum RTT values until it is plausible that the minimum RTT value correspond to the radial difference R2−R1.

The comparisons of snap-shots are performed using standard time and frequency domain techniques to determine the frequency of the minimum, the waveform frequency content, the departure from the minimum and other parameters as known to those skilled in statistics and data processing. Once it is verified that the minimum RTT values occurring at 1.25 and 2.75 seconds shown in FIG. 3a plausibly correspond to the $RTT_{min}$ value, the sound speed V of the drilling fluid 28 may be readily derived using Equation 1. For example, if the radial difference R2−R1 is 0.3 inches and the $RTT_{min}$ value is approximately 12 $\mu s$, then the sound speed V of the drilling fluid 28 is approximately 50,000 inches per second (in/sec) or approximately 1270 m/s. Once the sound speed V has been calculated in this manner, each of the measured RTT values can first be divided by 2 and then multiplied by the sound speed V and replotted on a graph illustrating stand-off distance SD, which is shown in FIG. 3b.

Figure 3B:
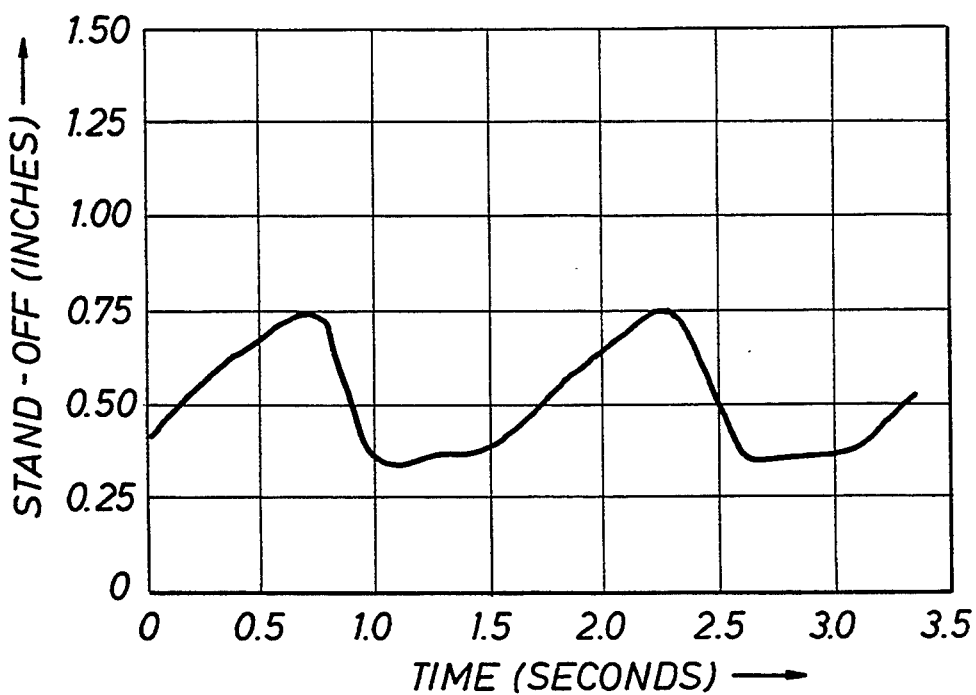

In FIG. 3b, the elapsed time in seconds is shown along the x-axis and stand-off distance SD measured in inches is provided along the y-axis. Therefore, FIG. 3b shows the stand-off distance SD about the circumference of the borehole wall 24 at the longitudinal position, or depth, of the transducer 34.

Another type of rotary drilling, commonly referred to as turbodrilling, is used where the drillstring 20 does not rotate but generally slides within the borehole, although some rotation may occur. A fluid-drive turbine, commonly called a mud motor (not shown) is placed in the drillstring 20 just above the drill bit. The pressure from the pumps at the surface pumping the drilling fluid 28 down through the central bore of the drillstring 20 turns the mud motor, which rotates the drill bit. Turbodrilling may be used to drill boreholes at almost any angle, including slanted or even horizontal boreholes. The techniques of the present invention apply to turbodrilling as well. FIG. 1 may be viewed clockwise at any angle to illustrate a slanted borehole, where a 90° clockwise view illustrates a horizontal borehole. In this case, a downside or bottom side 40 of the borehole wall 24 is distinguished from a top side 42, where the drillstring 20 is shown resting against the bottom side 40. The drillstring 20 also slides along the bottom side 40 of the borehole wall 24 while the drill bit penetrates further into the formation. The principles are the same as for conventional rotary drilling, where the transducer 34 is still displaced from the borehole wall 24 by the radial difference R2−R1 when the transducer 34 directly faces the bottom side 40.

In the case of turbodrilling, the drillstring 20 is manipulated and oriented until the transducer 34 is directly facing the bottom side 40 of the borehole wall. Again, an upset or the tubular member 30 displaces the transducer 34 from the borehole wall 24 at approximately the radial difference R2−R1. Orientation of the drillstring 20 is accomplished with tools at the surface or entry point of the borehole, and by performing surveys with magnetometers and accelerometers as known to those having ordinary skill in the art. Once the orientation of the transducer 34 is verified, the $RTT_{min}$ value measurement is made as described above.

Figure 4:
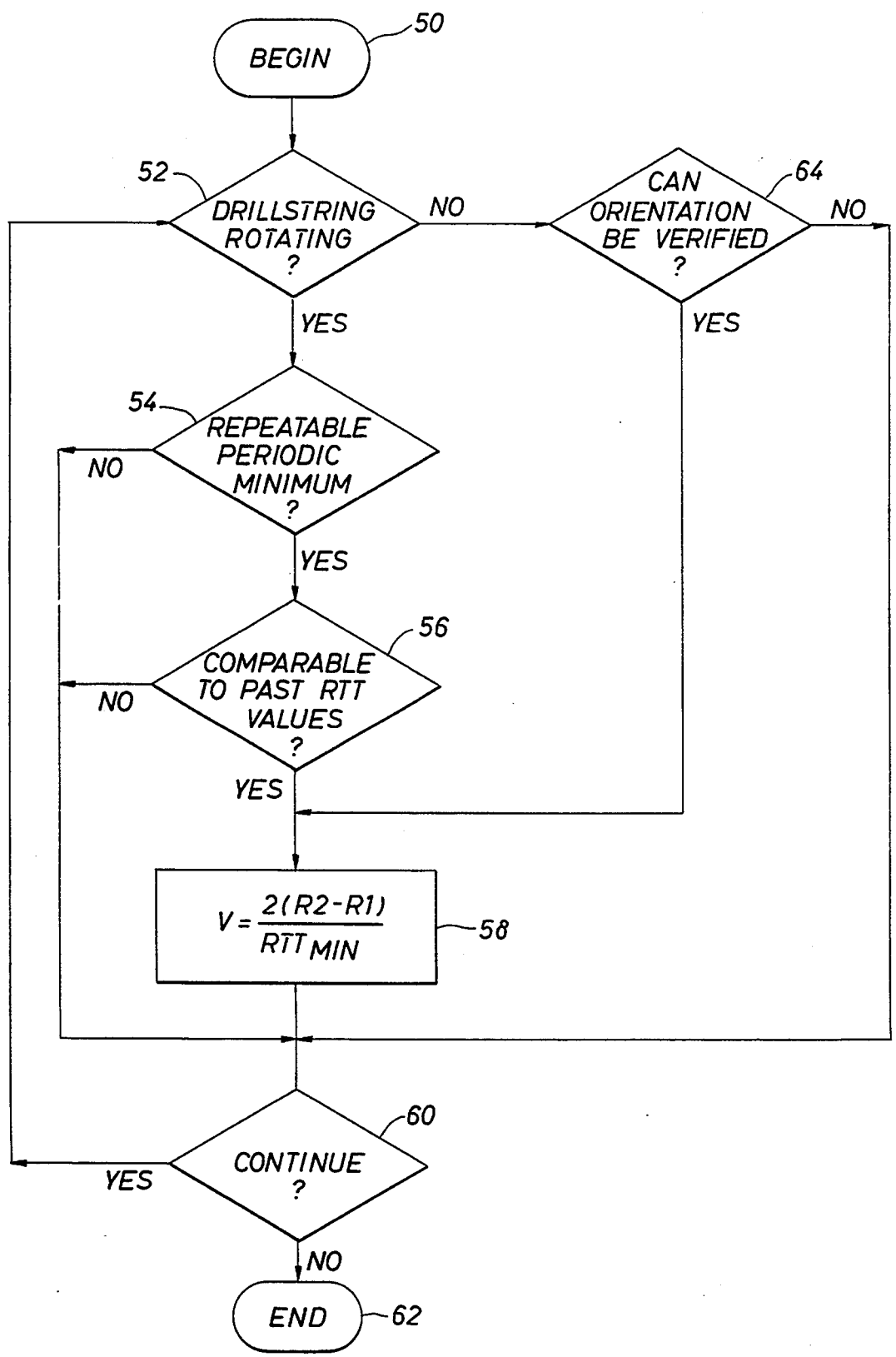
FIG. 4 is a flow chart diagram illustrating the operation of software in a computer system used to control and calculate sound speed and stand-off measurements.

Referring now to FIG. 4, a flow chart diagram is shown illustrating operation of software executing on the computer 70 of the computer and control apparatus 36. Operation begins at a step 50, and proceeds to a step 52 where it is queried whether the drillstring 20 is rotating within the borehole. As described above, the drillstring 20 is rotating during conventional rotary drilling operations and mostly sliding within the borehole during turbodrilling. The term "rotating" is used to describe any periodic movements of the drillstring 20, which is not necessarily a single-valued angular velocity. During turbodrilling, sliding may be accompanied by a slow rotation, but this is not always true.

If the drillstring 20 is rotating as determined in step 52, operation proceeds to a step 54 where it is queried whether the measured RTT values exhibit a periodic and repeatable minimum sequence. If so, then the minimum RTT values plausibly correspond to the $RTT_{min}$ value. In this case, it is determined whether the measured values calculated have the appearance of those obtained when the drillstring 20 is side-walled, where the tubular member 30 is contacting the borehole wall 24. As described previously, the RTT values should appear sinusoidal, indicating the transducer 34 is approaching and then receding from the borehole wall 24. If the pattern appears as expected, then the measurements are adequate to establish plausibility.

If the pattern is plausible as determined in step 54, operation proceeds to a step 56, where the minimum RTT value is compared with past minimum RTT values. It is not expected that the sound speed V of the drilling fluid 28 changes abruptly, although there are a few exceptions. For example, sudden changes in the sound speed V of the drilling fluid 28 could occur if the drillstring 20 is not rotating, if pump circulation is interrupted, if there is a sudden influx of gas or formation fluids, or if there is a sudden addition of lost circulation materials (LCMs). LCMs are introduced into the borehole if the drilling tool encounters a large crack or cavity, where LCMs are used to fill the cavity to prevent substantial loss of hydrostatic pressure. Although abrupt changes are not expected except under certain conditions including those listed above, the sound speed V of the drilling fluid will change over time. An apparatus according to the present invention will monitor these changes.

If the present minimum RTT value compares to past minimum RTT values in step 56 indicating that the sound speed V has not appreciably changed, operation proceeds to step 58 where the sound speed V is calculated according to Equation 1. From step 58, operation proceeds to a step 60 to determine whether to repeat the sequence or terminate. If operation is to be terminated, operation proceeds to step 62 and terminates. Otherwise, operation proceeds back to step 52 to repeat the loop. If the pattern is not plausible as determined in step 54 or if the present minimum values do not compare with past values as determined in step 56, operation proceeds directly to step 60 to determined whether to repeat the loop.

Referring back to step 52, if the drillstring 20 is not rotating, operation proceeds to a step 64, where it is queried whether orientation of the drillstring relative to the borehole wall 24 can be verified. If it is verified that the drillstring 20 is resting on the bottom side 40 of the borehole wall 24 and that the transducer 34 is facing the borehole wall 24, operation proceeds to a step 58 where the sound speed V is calculated using Equation 1. Since it is known that the transducer 34 is displaced from the borehole wall 24 by the radial difference R2−R1, procedures similar to those of steps 54 and 56 for determination of a repeatable and plausible minimum RTT value are unnecessary.

The storing, retrieving and analyzing the plurality of RTT values and elapsed time values in the form of snap-shots as described above requires some form of apparatus for measuring real-time, as well as an appreciable amount of memory for storing the RTT values and corresponding elapsed time values. Also, the software must include known routines capable of verifying a periodic, repeating minimum value to arrive at the $RTT_{min}$ value. An alternative technique for measuring the sound speed V of the drilling fluid 28 is the use of stand-off histograms, which may be constructed from the snap-shot data, but which may also be developed in real-time. In the latter case, the elapsed real-time values would not need to be measured or stored.

The histogram comprises a plurality of contiguous or sequential columns or bins within an expected total range of RTT values. Each bin is a count which corresponds to a predetermined sub-range of time within the total range, where each RTT value falling within the defined sub-range of time belongs to the corresponding bin. For example, if a total expected range of RTT values is 16 μs, 16 bins could be defined, each having a duration of 1 μs. The first bin is defined for 0–1 μs, the second bin is 1–2 μs and so on. An RTT value falling within the sub-range of time corresponding to a bin causes that bin to be incremented. Thus, if an RTT value of 1.5 μs is received, the second bin is incremented.

The number of bins and their sub-ranges bins may be varied, where some bins represent shorter or narrower sub-ranges than others. The width of the bins define the resolution desired for the measurement to be made. For example, if the radial difference is 0.3 inches and $RTT_{min}$ should range between 8.4 μs and 13.9 μs, about 100 bins could be defined between 5 and 15 μs, where each bin represents 0.1 μs. The lowest bin having the highest count number would plausibly correspond to the $RTT_{min}$ value. In particular, if a small number of counts, such as 3 or less, occurs in the first 51 bins and 40 counts occur in bin 52 corresponding to an RTT value of 10.2 μs, then the sound speed V of the drilling fluid would be approximately 58,824 in/sec. In this manner, the $RTT_{min}$ value is determined without having to store a plurality of RTT values and corresponding real-time values. Only a plurality of counts need be stored, which consumes very little memory.

It can now be appreciated that the MWD apparatus and technique of the present invention provides an accurate determination of sound speed V of the drilling fluid and the stand-off distance using a single acoustic transducer. The transducer is mounted on an MWD collar close to an upset or stabilizer blade, where the radius of the stabilizer blade or upset is greater than the radius of the MWD collar. In this manner, it need only be verified when the drillstring is resting or side-walled against and the transducer directly facing the borehole wall for the transducer to be displaced at a known distance from the borehole wall. In particular, this minimum distance is the radial difference between the MWD collar and the stabilizer blade or upset.

Verification of the $RTT_{min}$ value corresponding to the minimum distance is achieved using conventional statistical analysis techniques. In conventional rotary drilling situations, the RTT values are analyzed for a repeating, period minimum value. Alternatively, stand-off histograms are used to identify a high occurrence of a minimum RTT value or range, which corresponds to the $RTT_{min}$ value.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention. Various modifications of the techniques, procedures, material and equipment will be apparent those skilled in the art. It is intended that all such variations within the scope and spirit of the appended claims be embraced thereby.

I claim:

1. An MWD apparatus for measuring standoff in a borehole, the borehole having a borehole wall, wherein the standoff is the distance between the MWD apparatus and the borehole wall and the measurement is made in the presence of a drilling fluid in the borehole, the MWD apparatus comprising:
   a drillstring for drilling the borehole, said drillstring immersed in the drilling fluid;
   a first tubular member provided on said drillstring, said first tubular member having a radius R2;
   a second tubular member mounted with said first tubular member along said drillstring, said first tubular member having a radius R1, wherein R1 is less than R2;
   an acoustic transducer mounted on said second tubular member at a position near said first tubular member so that said transducer is separated from the borehole wall by approximately the radial difference R2−R1 when the drillstring and said first tubular member are side-walled against the borehole wall and when said second tubular member is oriented so that said transducer faces the borehole wall, said transducer including means for transmitting, receiving and detecting acoustic pulses;
   a computer and control apparatus electrically coupled to said transducer for activating said transducer to transmit an acoustic pulse and detecting said when said transducer receives an echo acoustic pulse, for measuring the roundtrip transmit time between each transmitted pulse generated by said transducer and its associated echo acoustic pulse, for analyzing a plurality of roundtrip transit time values to determine a minimum roundtrip transit time value corresponding to said transducer being separated from the borehole wall by the radial difference R2−R1, for calculating the sound speed of the drilling fluid as twice the radial difference R2−R1 divided by said minimum roundtrip transit time value, and for calculating standoff distance of said transducer by multiplying said sound speed of the drilling fluid by one half the value of said roundtrip transit times.

2. The MWD apparatus of claim 1, wherein said second tubular member an MWD drill collar.

3. The MWD apparatus of claim 1, wherein said first tubular member comprises upset tubing.

4. The MWD apparatus of claim 1, wherein said first tubular member comprises a stabilizer blade.

5. The MWD apparatus of claim 1, wherein said computer and control apparatus includes:
   a computer for asserting a pulse signal to initiate said transducer to transmit an acoustic pulse and for receiving an echo signal indicating that said transducer has detected an echo acoustic pulse;
   a control circuit coupled to said computer and said transducer, wherein said control apparatus includes:
      a pulser coupled to said computer and said transducer, said pulser receiving said pulse signal from said computer and activating said transducer in response,
      a receiver coupled to said transducer for receiving and amplifying electrical signals generated by said transducer in response to receiving said echo acoustic pulse, and
      a detector coupled to said receiver and said computer for receiving said amplified electrical signals from said receiver and providing said echo signal to said computer in response.

6. The MWD apparatus of claim 1 wherein said computer and control apparatus analyzes said plurality of roundtrip transit time values to determine whether a periodic and repeated minimum roundtrip transit time value is measured.

7. The MWD apparatus of claim 1 wherein said computer and control apparatus retrieves a plurality of roundtrip transit time values and corresponding real-time values into a snap-shot, and further retrieves a plurality of such snap-shots, and analyzes said plurality of snap-shots to determine if a periodic minimum roundtrip transit time value has occurred and whether said minimum periodic roundtrip transit time value has been repeated in said plurality of snap-shots.

8. The MWD apparatus of claim 1 wherein said computer and control apparatus divides a predetermined total range of expected roundtrip transit time values into a plurality of contiguous bins, each said bin representing a sub-range of said total range of expected roundtrip transit times values, and wherein said computer measures each roundtrip transit time value and increments a corresponding bin.

9. The MWD apparatus of claim 8 wherein said computer and control apparatus receives a plurality of roundtrip transit time values and increments said corresponding bins, and determines said minimum roundtrip transit time value from a bin having the greatest count corresponding to the least roundtrip transit time value.

10. An MWD apparatus for measuring standoff in a borehole, the borehole having a borehole wall and wherein the standoff is measured in the presence of a drilling fluid in the borehole, the MWD apparatus comprising:
- a drillstring for drilling the borehole, said drillstring immersed in the drilling fluid;
- a first tubular member provided on said drillstring, said first tubular member having a radius R2;
- a second tubular member mounted with said first tubular member along said drillstring, said second tubular member having a radius R1, wherein R1 is less than R2;
- an acoustic transducer mounted on said second tubular member at a position near said first tubular member so that said transducer is separated from the borehole wall by approximately the radial difference R2−R1 when the drillstring and said first tubular member are side-walled against the borehole wall and when said second tubular member is oriented so that said transducer faces the borehole wall, said transducer being means for transmitting, receiving and detecting acoustic pulses;
- a computer and control apparatus electrically coupled to said transducer for activating said transducer to transmit an acoustic pulse, for detecting when said transducer receives an echo acoustic pulse, for measuring a roundtrip transit time between a transmitted acoustic pulse and its associated echo acoustic pulse for determining minimum roundtrip transit time, for calculating the sound speed of the drilling fluid as twice the radial difference R2−R1 divided by said minimum roundtrip transit time value, and for calculating said standoff of said transducer by multiplying said sound speed for the drilling fluid by one half of the value of said roundtrip transit times;
- apparatus for manipulating and often rating said drillstring;
- apparatus to verify that said drillstring is sidewalled against the borehole wall and that the drillstring is oriented so that said transducer is facing the borehole wall at the radial position wherein said drillstring is sidewalled; and
- wherein said drillstring is manipulated and oriented so that said transducer is facing the borehole wall at the radial position wherein said drillstring is sidewalled, and wherein said computer and control apparatus activates said transducer to send an acoustic pulse and detects an associated echo acoustic pulse to measure said minimum roundtrip transit time value.

11. The MWD apparatus of claim 10, wherein said verifying apparatus comprises magnetometers and accelerometers.

12. The MWD apparatus of claim 10, wherein said second tubular member is an MWD drill collar.

13. A MWD method for measuring standoff in a borehole, the borehole having a borehole wall wherein the measurement is made in the presence of drilling fluid in the borehole the method comprising:
- providing a drillstring for drilling the borehole, said drillstring immersed in the drilling fluid;
- providing a first tubular member provided on said drillstring, said first tubular member having a radius R2;
- providing a second tubular member mounted with said first tubular member along said drillstring, said first tubular member having a radius R1, wherein R1 is less than R2;
- providing an acoustic transducer mounted on said second tubular member at a position near said first tubular member so that said transducer is separated from the borehole wall by approximately the radial difference R2−R1 when the drillstring and said first tubular member are sidewalled against the borehole wall and when said second tubular member is oriented so that said transducer faces the borehole wall, said transducer being means for transmitting, receiving and detecting acoustic pulses;
- providing a computer and control apparatus electrically coupled to said transducer for activating said transducer to transmit an acoustic pulse and detecting when said transducer receives an echo acoustic pulse, measuring the roundtrip transit time between each transmitted pulse generated by said transducer and its associated echo acoustic pulse, analyzing a plurality of roundtrip transit time values to determine a minimum roundtrip transit time value corresponding to said transducer being separated from the borehole wall by the radial difference R2−R1, calculating the sound speed of the drilling fluid as twice the radial difference R2−R1 divided by said minimum roundtrip transit time value, and calculating corresponding standoff of said transducer by multiplying said sound speed of the drilling fluid by one half of the value of said roundtrip transit times.

14. The method of claim 13 wherein said second tubular member is an MWD drill collar.

15. The method of claim 13 wherein said first tubular member comprises upset tubing.

16. The method of claim 13 wherein said first tubular member comprises a stabilizer blade.

17. The method of claim 13 wherein said computer and control apparatus operates by:
  (a) asserting a pulse signal to initiate said transducer to transmit an acoustic pulse and receiving an echo signal indicating that said transducer has detected an echo acoustic pulse;
  (b) providing a control circuit coupled to said computer and to said transducer, wherein said control apparatus:
    (1) activates said transducer upon receiving said pulse signal from said computer;
    (2) receives and amplifies signals generated by said transducer in response to receiving said echo acoustic pulse; and
    (3) detects said amplified signals and provides said echo signal to said computer in response.

18. The method of claim 13 wherein said computer and control apparatus analyzes said plurality of roundtrip transit time values to determine whether a periodic and repeated minimum roundtrip transit time value is measured.

19. The method of claim 13 wherein a plurality of roundtrip transit time values for a predetermined period of elapsed time are acquired and stored as a function of realtime values into a snap-shot, a plurality of said snap-shots are acquired and stored, and said snapshots are analyzed to determine whether a periodic minimum roundtrip transit time value has occurred and whether said minimum periodic roundtrip transit time value has been repeated in said plurality of snap-shots.

20. The method of claim 13 wherein said computer and control apparatus divides a predetermined total range of expected roundtrip transit time values into a plurality of contiguous bins, each said bin representing a subrange of said total range of expected roundtrip transit time values, and wherein said computer measures each roundtrip transit time value and increments a corresponding bin.

21. The method of claim 20 wherein said computer and control apparatus receives a plurality of roundtrip transit time values and increments said corresponding bins, and determines said minimum roundtrip transit time value from a bin having the greatest count corresponding to the least roundtrip transit time value.

22. A MWD method for measuring stand-off in a borehole, the borehole having a borehole wall wherein the standoff is measured in the borehole in the presence of drilling fluid, the method comprising:

providing a drillstring for drilling the borehole, and said drillstring is immersed in the drilling fluid;

providing a first tubular member on said drillstring, said first tubular member having a radius R2;

providing a second tubular member mounted on said first tubular member along said drillstring, said second tubular member having a radius R1, wherein R1 is less than R2;

providing an acoustic transducer mounted on said second tubular member at a position near said first tubular member so that said transducer is separated from the borehole wall by approximately the radial difference $R2-R1$ when the drillstring and said first tubular member are side-walled against the borehole wall and when said second tubular member is oriented so that said transducer faces the borehole wall, said transducer being means for transmitting, receiving and detecting acoustic pulses;

providing a computer and control apparatus electrically coupled to said transducer for activating said transducer to transmit an acoustic pulse, for detecting when said transducer receives an echo acoustic pulse, for measuring roundtrip transit times between a transmitted acoustic pulse and its associated echo acoustic pulse, for measuring a minimum roundtrip transit time between a transmitted acoustic pulse and its associated echo acoustic pulse, for calculating the sound speed of the drilling fluid as twice the radial difference $R2-R1$ divided by said minimum roundtrip transit time value and for calculating standoff as said sound speed of the drilling fluid multiplied by one half of the values of said corresponding roundtrip transit times;

providing an apparatus for manipulating and orientating said drillstring;

providing an apparatus for verifying that said drillstring is side-walled against the borehole wall and that said drillstring is oriented so that said transducer is facing the borehole wall at the radial position wherein said drillstring is side-walled; and wherein said drillstring is manipulated and oriented so that said transducer is facing the borehole wall at the radial position wherein said drillstring is side-walled, and wherein said computer and control apparatus activates said transducer to send an acoustic pulse and detects an associated echo acoustic pulse to measure said minimum roundtrip transit time value.

23. The MWD method of claim 22 wherein said verifying apparatus measures magnetic and gravity vectors.

24. The MWD apparatus of claim 20 wherein said second tubular member is an MWD drill collar in the drillstring.

* * * * *